Jan. 18, 1944.  J. C. CROWLEY  2,339,381
TRACTOR VALVE
Filed May 6, 1941

INVENTOR.
JOHN C. CROWLEY
BY Kwis Hudson & Kent
ATTORNEYS

Patented Jan. 18, 1944

2,339,381

UNITED STATES PATENT OFFICE 2,339,381

TRACTOR VALVE

John C. Crowley, Cleveland Heights, Ohio, assignor to The Dill Manufacturing Company, Cleveland, Ohio, a corporation of Ohio Application May 6, 1941, Serial No. 392,077

13 Claims. (Cl. 152—427)

This invention relates to a valve mechanism and particularly to a valve mechanism especially adapted to be used with a container that is inflated or partially inflated with liquid as, for example, a tire for the wheel of a tractor or similar piece of apparatus.

It is customary to inflate or partially inflate the tires for the wheels of tractors and similar apparatus with liquid in order to provide additional weight to the wheels to improve the traction thereof.

In inflating such tires with liquid the air in the tires will be compressed by the liquid and the introduction of the inflating liquid to the desired amount and at an efficient speed is prevented or hindered unless provision is made to vent all such air fully and quickly to atmosphere.

An object of the invention is to provide an improved valve mechanism for tires of the character specified and which mechanism enables and facilitates the proper and desired inflation of the tires with liquid, in that it embodies adequate provisions for venting all the air readily and quickly from the tires as the liquid is introduced into the same.

It may be desirable, however, after the tires have been filled substantially with liquid to superimpose upon the liquid in the tires a certain amount of pneumatic pressure in order to have the tires properly inflated and to provide sufficient pressure to assure adequate seating of the valves in the valve mechanism. Likewise, the tires may be only partially inflated with liquid, in accordance with the weight desired for the wheels, and then inflated to the desired amount by air.

A further object of the invention is to provide a valve mechanism for tires of the character specified and which mechanism embodies means for introducing air into the tires, in addition to the means for introducing liquid thereinto and venting air therefrom.

Another object is to provide a valve mechanism of the character specified and which is efficient in operation, simple in construction and can be readily adjusted to provide for the introduction either of liquid or air into the tires.

Further and additional objects and advantages not hereinbefore specified will become apparent hereinafter during the following detailed description of an embodiment of the invention which is illustrated in the accompanying drawing and wherein, Fig. 1 is a partly sectional view transversely through a tire of the character referred to and through the valve mechanism, the valve mechanism and tire being illustrated as located in substantially the highest part of the wheel.

Figures 1, 2, 3:
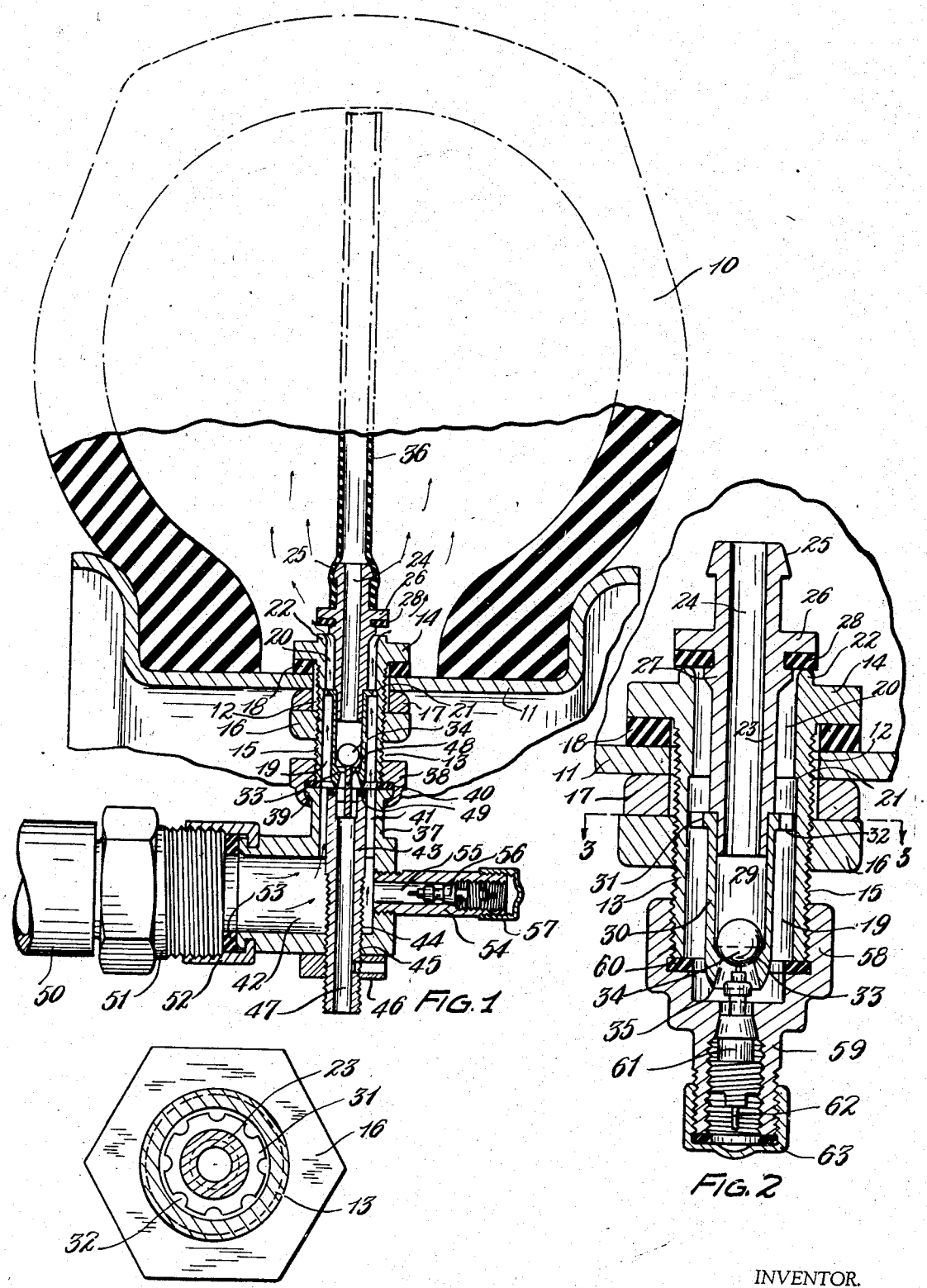
Fig. 2 is a fragmentary view of the tire and rim and shows the valve mechanism in section, with the parts thereof in different relationship than in Fig. 1 and with the valves proper of the mechanism seated, that is, the parts of the valve mechanism, as shown in Fig. 2, are in the relationship they have after the tire has been inflated and the tractor or apparatus is ready for use.
Fig. 3 is a detail sectional view taken substantially on line 3—3 of Fig. 2, looking in the direction of the arrows.

The valve mechanism embodying the present invention is shown as operatively associated with a tire 10 mounted on the rim 11 of a wheel for a tractor or similar apparatus. The tire 10 is of usual construction as is also the rim 11, it being understood, however, that the rim 11 may differ in form from that illustrated as, for example, it might be a rim known in the art as a "drop center" rim. The rim 11 is provided with a valve opening 12 through which extends a valve stem 13.

This valve stem 13 is provided on its inner end within the tire with a flanged head 14 which engages with a gasket 18 interposed between it and the rim 11. The stem 13 is externally threaded as indicated at 15 and is clamped to the rim 11 and in position in the opening 12 by means of a clamping nut 16 screwed on the threads 15 and acting against a washer 17 to firmly engage the gasket 18 and the washer 17 against the opposite sides of the rim 11 with a tight sealing contact. The stem 13 is provided with a bore therethrough formed of an enlarged outer portion 19 and a reduced inner portion 20, wherefore an internal annular shoulder 21 is provided at the inner end of the outer portion 19. The head 14 of the valve stem 13 is provided on its inner face with an annular rib 22 that concentrically surrounds the inner end of the bore through the valve stem and has its inner end curved in cross section. The rib 22 forms a valve seat for a valve later to be described.

A two-part movable valve member is mounted in the valve stem 13 and comprises an inner part 23 having a bore 24 therethrough. The inner part 23 extends beyond the annular rib 22 and into the tire cavity and is provided at its inner end with a conical knob 25 for a purpose later to be explained. The inner part 23 of the two-part valve member is provided with a flange 26 spaced outwardly of the knob 25, while spaced from this flange 26 the inner part 23 has a smaller flange 27 formed with a conical outwardly disposed portion and a cylindrical portion and defining with the flange 26 an annular groove for retaining the disk or gasket 28 in position on the flange 26. This disk or gasket forms a valve packing adapted to seat with a sealing engagement on the annular rib 22.

It will be noted that the area of the flange 26 which is exposed to the pressure of the liquid or air in the tire is substantially greater when the disk 28 is seated on the rib 22 than is the area of the disk 28 lying between the wall of the inner portion 20 of the bore through the valve stem 13 and the circumference of the flange 27 taken together with the area of the conical portion of the flange 27.

The inner part 23 of the two-part valve member is of substantially smaller diameter than the inner portion 20 of the bore through the valve stem 13 and extends into the enlarged portion 19 of said bore. The outer end of the inner part 23 is provided externally with a portion of reduced diameter to provide an external shoulder, and this portion telescopes into the outer part 30 of the two-part valve member with a forced fit, wherefore the inner part 23 and the outer part 30 are connected to operate or move as a unit. The outer part 30 has its inner end engaged with the external shoulder formed by the reduced end portion of the inner part 23 and said inner end is provided with an integral flange 31 of slightly less diameter than the outer portion 19 of the bore through the valve stem. The flange 31 which serves as a guide for the two-part valve member is provided on its circumference with a plurality of circumferentially spaced inwardly extending notches 32.

The bore 29 through the outer part 30 is restricted to provide a conical valve seat 33 for a ball valve 34 floating in the bore 29 and positioned therein prior to the parts 23 and 30 being united. The outer end of the outer part 30 extends beyond the free or outer end of the valve stem 13 and is shaped to provide a relatively sharp edge or seat 35.

Normally the valve disk 28 is seated on the rib 22 while the ball valve 34 is seated on the conical seat 33 and when this condition exists the passages through the valve mechanism are closed.

A tube 36 is mounted on the knob 25 of the inner part 23 of the two-part valve member and extends across the tire cavity to closely adjacent the tread portion of the tire, as clearly indicated in Fig. 1. This tube 36 is preferably formed of rubber or similar material of sufficient rigidity to maintain itself in the vertical position shown in the drawing.

When it is desired to inflate the tire 10 the wheel on which the tire is mounted is positioned so that the valve mechanism will be located at substantially the high point of the wheel, while the free end of the tube 36 will be positioned at substantially the highest point of the internal tire cavity. A fitting 37 is connected to the valve stem 13 by means of a nut 38 swivelly connected to a flange 39 on the fitting and screwed onto the external threads 15 of the valve stem 13. A gasket 40 is interposed between the flange 39 and the free or outer end of the valve stem 13, wherefore the fitting 37 and the valve stem have a liquid and air-tight connection to each other. The fitting 37 has an internal passage 41 in communication with the interior of the valve stem 13 and with a passage 42 in the fitting extending transversely to the passage 41. The fitting 37 carries a tubular connector member 43 which is externally threaded for a portion of its length, as indicated at 44, and extends across the passage 42 and longitudinally through the passage 41.

The externally threaded portion of the member 43 extends through a tapped opening 45 in the fitting 37 to a point externally of the latter, wherefore said member can be screwed to adjust its inner end in the passage 41 of the fitting. A nut 46 is fixed to the threaded portion of the member 43 externally of the fitting 37 and serves as an operating handle for adjusting the member 43 as just referred to.

The member 43 is provided with a bore 47 extending therethrough, while a valve actuating pin 48 is mounted rigidly therein adjacent the inner end of the member and extends beyond said end, it being understood that the pin 48 is so mounted as to provide passages around the same. The inner end of the member 43 is provided with a counterbore in which is mounted a gasket 49 that can be brought into sealing contact with the edge 35 of the outer part 30 of the two-part valve member to move said member inwardly until the flange 31 contacts the shoulder 21 in the valve stem 13. When this relationship has been obtained the valve disk 28 is unseated with respect to the annular rib 22, while the ball valve 34 has been moved off its seat 33 by the pin 48, as clearly shown in Fig. 1. At this time it will be noted that the passage 41 in the fitting 37 is in communication with the interior of the tire through the passages between the valve stem 13 and the two-part valve member. It will also be noted that the interior of the tire is in communication with atmosphere through the tube 36, the two-part valve member and the member 43, it being recalled that the free end of the tube is located at the highest point of the internal tire cavity.

The fitting 37 may be connected to a source of liquid supply by means of a conduit 50 carrying at its free end a threaded coupling nut 51 which screws into an internally threaded coupling sleeve 52 that is swivelly connected to the fitting 37, it being noted that a gasket 53 is interposed between the end of the coupling nut 51 and the end of the fitting 37. The conduit 50 may be connected with a source of liquid supply under pressre, or it may extend to such a source located at sufficient elevation to provide for the flow of liquid by gravity. The flow of liquid into the conduit 50 may be controlled by a suitable valve, not shown, as will be well understood.

Assuming the liquid is flowing through the conduit 50 and into the fitting 37, it will be seen that it will flow through the valve stem 13 in the passages provided between the wall of the bore through said stem and the periphery of the two-part valve member and thence into the tire, as indicated by the arrows in Fig. 1. As this liquid flows into the tire the air that is within the tire cavity rises to the highest point and is vented to atmosphere through the tube 36, the bores in the two-part valve member and the bore 41 in the member 43.

It will be noted that none of the liquid flowing into the tire will pass into the bores through the two-part valve member and around the ball valve 34 because of the seal provided by the gasket 49 on the inner end of the member 43. The liquid can enter the tire to completely fill the same, inasmuch as the air within the tire is freely vented to atmosphere from the highest point of the internal tire cavity.

When the tire is completely filled with liquid the operator can determine such fact because the liquid will run through the tube 36, the two-part valve member and out of the passage 47 in the member 43, whereupon the operator can stop the flow of liquid through the conduit 50.

The operator now turns the nut 46 to adjust the member 43 outwardly and move the gasket 49 in a direction away from the edge 35 of the outer part 30 of the two-part valve member. This adjustment of the member 43 allows the two-part valve member to move outwardly under the pressure of the liquid and also by gravity until the valve disk 28 seats on the rib 22. The adjustment of the member 43 just described also moves the valve actuating pin 48 away from the ball valve 34, with the result that said ball valve seats on the seat 33 under the pressure of the liquid and by gravity.

It will be seen that now the valve disk 28 and the ball valve 34 are seated, and the valve mechanism is closed. When this has taken place the fitting 37 may be detached from the valve stem. On the other hand it may be considered desirable to superimpose on the liquid in the tire a certain amount of air pressure for various reasons as, for example, to assist in maintaining the valve disk 28 and the ball valve 34 tightly seated on their seats when the wheel on which the tire is mounted is rotating. This may be done by injecting air into the tire through an air inflating member 54, which has an externally threaded end screwed into a tapped opening in the fitting 37.

The member 54 projects outwardly from the fitting 37 and is provided with a bore 55 therethrough and in communication with the passage 42 in the fitting and so shaped and threaded as to receive and retain therein a conventional valve insides or core 56. The member 54 has its outer end externally threaded and can be provided with a removable valve cap 57.

When the cap 57 is removed and an air chuck or other fitting connected to a source of supply of air under pressure applied to the outer end of the member 54, the valve of the valve core 56 is unseated and air flows through the passage 55 into the passages in the fitting 37 and thence into the valve stem and against the ball valve 34 which became seated when member 43 was adjusted outwardly. This air pressure will unseat the ball valve 34 and allow the air to pass through the bores in the two-part valve member and the tube 36 into the tire. Of course the air also passes into the passages between the two-part valve member and the valve stem, but inasmuch as the valve disk 28 is seated air does not pass into the tire at this point.

It will be recalled that the areas of the flange 27 of the two-part valve member and of the valve disk 28 which are exposed to this air pressure are substantially less than the area of the flange 26 that is exposed to the pressure within the tire, and this differential in areas allows the pressure within the tire to hold the valve disk 28 seated during the introduction of the compressed air. As soon as the desired amount of air pressure has been introduced into the tire the operator removes the air chuck or other connection from the member 54, whereupon the valve of the valve core 56 seats as does also the ball valve 34.

When air is being inserted into the tire through the member 54 of course the valve which controls the flow of liquid into the conduit 50 will be closed. If desired the conduit 50 can be removed and the large open end of the fitting 37 sealed up to allow the introduction of air through the member 54.

The description heretofore given has been in contemplation of completely filling or substantially completely filling the tire with liquid. It will be understood, however, that under certain conditions it may be desirable to have less weight on the wheels and not to completely fill the tire with liquid. Under such circumstances the tire would be filled only partially with liquid in the same way as liquid would be introduced for the complete filling of the tire, and then compressed air would be utilized to complete the inflation of the tire, it being understood that such compressed air would be introduced through the member 54 in the manner already specified.

When the tire has been completely inflated, either with the liquid alone or partially with liquid and partially with air, the fitting 37 is detached from the valve stem 13. After this fitting 37 has been detached a valve cap is screwed onto the free end of the valve stem 13 and this cap comprises an internally threaded cup-shaped portion 58 and an integral outwardly extending valve core receiving stem portion 59, see Fig. 2.

The cup-shaped portion 58 is provided with an internal shoulder on which seats a gasket 60 that engages with the outer end of the valve stem 13 when the cap is screwed onto the stem and forms a seal between the stem and cap. The portion 59 of the cap is provided with a bore shaped and threaded to removably receive and retain a conventional valve core or valve insides 61. When this valve core or insides is fully mounted in the portion 59 the inner end of the valve pin 62 thereof lies closely adjacent to the ball valve 34 when the latter is seated on its seat 33.

The outer end of the valve pin 62 is located adjacent to the open end of the cap 59, wherefore when an air chuck or other suitable fitting is applied to the end of the portion 59 of the cap the pin 62 will be displaced to unseat the valve of the valve core or insides and the same operation results in the inner end of the valve pin 62 positively unseating the ball valve 34. It may be that after the inflated tire has been in use it will be desired to inject into the same a certain amount of air pressure and this can be done by simply applying the usual air chuck on the end of an air pressure supply line to the outer end of the portion 59 of the cap to unseat the valve of the valve core 61 and the ball valve 34.

It will be understood that as soon as the chuck is removed the valve of the valve core seats under the action of its valve spring (not shown) while the ball valve 34 seats under the internal pressure in the tire. A secondary cup-shaped cap 63 may be screwed onto the outer end of the portion 59 of the valve cap to act as an additional seal and to keep dirt and other foreign matter from entering the valve cap and the valve mechanism.

Although a preferred embodiment of the invention has been illustrated and described herein it will be understood that the invention is susceptible of various modifications and adaptations within the scope of the appended claims.

Having thus described my invention, I claim:

1. A valve mechanism for inflating an article with fluid comprising a valve stem adapted to be connected to said article, a member in said stem and defining therewith a passage through said stem, valve means for closing said passage, said member being provided with a bore therethrough constituting a second passage through said stem, valve means for closing said second passage, and a member detachably connected to said stem and provided with means for unseating said last named valve means.

2. A valve mechanism for inflating an article with fluid comprising a valve stem adapted to be connected to said article, a member in said stem and defining therewith a passage through said stem, valve means for closing said passage, said member being provided with a bore therethrough constituting a second passage through said stem, valve means for closing said second passage, and a member detachably connected to said stem and provided with means for unseating both of said valve means.

3. A valve mechanism for inflating an article with fluid comprising a valve stem adapted to be connected to said article, a member mounted in said stem and movable axially thereof and defining therewith a passage through said stem, valve means associated with said stem and member for closing said passage and controlled by the axial movement of said member, said member being provided with a bore therethrough constituting a second passage through said stem, valve means for closing said second passage, and a member detachably connected to said stem to be removed therefrom independently of said first member and provided with means for unseating one of said valve means.

4. A valve mechanism for inflating an article with fluid comprising a valve stem adapted to be connected to said article, a member mounted in said stem and movable axially thereof and defining therewith a passage through said stem, valve means associated with said stem and member for closing said passage and controlled by the axial movement of said member, said member being provided with a bore therethrough constituting a second passage through said stem, valve means for closing said second passage, and a member detachably connected to said stem and provided with means for unseating said last named valve means.

5. A valve mechanism for inflating an article with fluid comprising a valve stem adapted to be connected to said article, a member mounted in said stem and movable axially thereof and defining therewith a passage through said stem, valve means associated with said stem and member for closing said passage and controlled by the axial movement of said member, said member being provided with a bore therethrough constituting a second passage through said stem, valve means for closing said second passage, and a member detachably connected to said stem to be removed therefrom independently of said first member and provided with means for moving said first named member axially and unseating said first named valve means.

6. A valve mechanism for inflating an article with fluid comprising a valve stem adapted to be connected to said article, a member mounted in said stem and movable axially thereof and defining therewith a passage through said stem, valve means associated with said stem and member for closing said passage and controlled by the axial movement of said member, said member being provided with a bore therethrough constituting a second passage through said stem, valve means for closing said second passage, and a member detachably connected to said stem and provided with means for moving said first named member axially and for unseating both of said valve means.

7. A valve mechanism for inflating an article with fluid comprising a valve stem adapted to be connected to said article, a member mounted in said stem and movable axially thereof and defining therewith a passage through said stem, valve means associated with said stem and member for closing said passage and controlled by the axial movement of said member, said member being provided with a bore therethrough constituting a second passage through said stem, valve means for closing said second passage, a member detachably connected to the outer end of said stem and provided with a passage in communication with said first named passage, a connector member adjustably mounted in said last named member and provided with means for engaging the outer end of said first named member with a sealing engagement to move the latter axially and open said first named valve, said last named member also being provided with means for opening said last named valve means.

8. A valve mechanism as defined in claim 7 and including an air inflating member connected to said second named member and in communication with the passage therein and shaped to receive and retain within it a valve mechanism.

9. A valve mechanism for inflating an article with fluid comprising a valve stem adapted to be connected to said article, a member in said stem and defining therewith a passage through said stem, valve means for closing said passage, said member being provided with a bore therethrough constituting a second passage through said stem, valve means for closing said second passage, and a member secured to the outer end of said stem with sealing engagement and provided with a passage therethrough in communication with both of said previously named passages, said member having a portion of the passage therethrough shaped to receive and retain a valve mechanism therein in such position that when said mechanism is actuated said second named valve means is unseated.

10. In combination with a tire rim and a tire mounted thereon, a valve mechanism for inflating the tire with fluid and comprising a valve stem extending through said rim and connected thereto as an operative part thereof and in communication with the interior of the tire, a member mounted in said stem and movable axially thereof and defining therewith a passage through said stem communicating with the interior of the tire, valve means associated with said stem and member for closing said passage and controlled by the axial movement of said member, said member being provided with a bore therethrough constituting a second passage through said stem in communication with the interior of the tire, and valve means located within said stem for closing said second passage.

11. In combination with a tire rim adapted to have a tire mounted thereon, a valve mechanism for inflating said tire and comprising a valve stem extending through said rim and connected thereto as an operative part thereof, a member mounted in said stem and movable axially thereof and defining therewith a passage through said stem, valve means associated with said stem and member for closing said passage and including a valve seat formed on said stem and a valve carried by said member, said member being provided with a bore therethrough constituting a second passage through said stem, said member being provided in said bore and within said stem with a valve seat, and a valve mounted in said bore and cooperating with said last named valve seat.

12. In combination with a tire rim adapted to have a tire mounted thereon, a valve mechanism for inflating said tire and comprising a valve stem extending through said rim and connected thereto to be an operative part thereof, a member mounted in said stem and movable axially thereof and defining therewith a passage through said stem, valve means associated with said stem and member for closing said passage and controlled by the axial movement of said member and including a valve seat formed on one of said parts and a valve carried by the other of said parts, said member being provided with a bore therethrough constituting a second passage through said stem, valve means located within said stem for closing said second passage, and a tube connected to the inner end of said member and extending beyond the inner end of said stem a substantial distance.

13. In combination with a tire rim adapted to have a tire mounted thereon, a valve mechanism for inflating said tire and comprising a valve stem extending through said rim and connected thereto to be an operative part thereof, a member mounted in said stem and extending beyond the inner end thereof and movable axially of said stem and defining therewith a passage through said stem, said stem being provided on its inner end with a valve seat, said member big provided with valve means cooperating with said seat for closing said passage and controlled by the axial movement of said member, said member being provided with a bore therethrough constituting a second passage through said stem, and valve means located within said stem for closing said second passage.

JOHN C. CROWLEY.